United States Patent [19]
Garvey et al.

[11] Patent Number: 5,236,651
[45] Date of Patent: Aug. 17, 1993

[54] EXTRUSION, COLLECTION, AND DRYING OF CERAMIC PRECURSOR GEL TO FORM DRIED GEL PARTICLES

[75] Inventors: Garry J. Garvey, Dobbs Ferry; Paul A. Iacobucci, Patterson; John D. Nowak, Yonkers, all of N.Y.

[73] Assignee: Akzo N.V., Arnhem, Netherlands

[21] Appl. No.: 801,152

[22] Filed: Dec. 2, 1991

[51] Int. Cl.$^5$ ............................................. C01B 33/12
[52] U.S. Cl. .................................. 264/140; 65/17; 423/338
[58] Field of Search ................ 65/17, 18.1, 18.2, 18.3, 65/18.4, 901; 264/140, 67, 63; 423/338

[56] References Cited

U.S. PATENT DOCUMENTS

| | | | |
|---|---|---|---|
| 3,920,783 | 6/1966 | Hara et al. | 264/141 |
| 4,098,595 | 7/1978 | Lenz et al. | 65/17 |
| 4,166,147 | 8/1979 | Lange et al. | 264/15 |
| 4,310,441 | 1/1982 | Alafandi et al. | 252/453 |
| 4,341,663 | 7/1982 | Derieth et al. | 264/142 |
| 4,767,429 | 8/1988 | Fleming et al. | 65/18.1 |
| 4,789,389 | 12/1988 | Schermerhorn et al. | 65/18.1 |
| 4,838,914 | 6/1989 | Ohta et al. | 65/18.4 |
| 4,865,829 | 9/1989 | Hattori et al. | 423/338 |
| 4,872,895 | 10/1989 | Fleming et al. | 423/338 |
| 4,943,425 | 6/1990 | Su et al. | 423/338 |

FOREIGN PATENT DOCUMENTS 2178020A 2/1987 United Kingdom ............... 65/18.1

*Primary Examiner*—Jay H. Woo
*Assistant Examiner*—Robert B. Davis
*Attorney, Agent, or Firm*—Richard P. Fennelly; Louis A. Morris

[57] ABSTRACT

Particulate ceramic precursor gel compositions (e.g., particulate silica gel) are formed by mechanically extruding a substantially monolithic, substantially undried ceramic precursor gel through a screen using a mechanical force which is supplied substantially normal to the plane of the screen to directly form the particulate composition, collecting the extrudate in a substantially non-stacked configuration, and drying the extrudate, e.g., in a dryer without imposition of strong vacuum when the extrudate is in substantially nonlayered configuration, to substantially maintain its particle morphology.

6 Claims, No Drawings

EXTRUSION, COLLECTION, AND DRYING OF CERAMIC PRECURSOR GEL TO FORM DRIED GEL PARTICLES

BACKGROUND OF THE INVENTION

There is recent interest in forming ceramic precursor gel particles of relatively high purity from gels (either organic bearing or inorganic derived sols). Such gel particles can then be fired to form a particulate, high purity ceramic product. In U.S. Pat. No. 4,789,389 to P. M. Schermerhorn et al., a process for forming silica-gel granules, for example, is described which comprises the condensation of an alkyl orthosilicate, such as, tetraethylorthosilicate, to form a gel followed by drying the gel to produce granules having a mean particle size of less than about one millimeter. The drying is performed at a rapid enough rate to cause the gel to fragment into granules having the desired mean particle size.

U.S. Pat. Nos. 4,098,595 and 4,243,422 to A. Lenz et al. teach drying of a silica gel followed by treatment of the dried gel with water and, if necessary, comminution (e.g., by mechanical grinding of the excessively larger granules that may remain).

While it is known to extrude ceramic precursor gels, it generally has not hitherto been appreciated that such a technique can be used to directly form a particulate product. As used herein the term "particulate" is to be construed as meaning a relatively small, discrete unit of the desired ceramic precursor material which is substantially resistant to further reduction in size. This contrasts these materials from extruded pellets, fibers, or other formed bodies which have a substantial propensity for further size reduction. The following disclosures exist in the art in regard to use of extrusion techniques to form such formed bodies rather than particulate compositions:

1. U.S. Pat. No. 3,920,783 to H. Hara et al. describes the extrusion of a kneaded mass to form constant length pellets (e.g., of alumina, silica, silicates, silicon carbide, titania, zirconia, magnesia, etc.). The pellets are formed from a rod from the extruder nozzle when the rod makes contact with a travelling conveyor belt.

2. U.S. Pat. No. 4,166,147 to R. W. Lange et al. mention extrusion in air of a viscous titania sol to form a green fiber which is then heated and fired.

3. U.S. Pat. No. 4,310,441 to H. Alafandi et al. teaches extrusion of a silica gel to form cylindrical pellets which are then dried and heated.

4. U.S. Pat. No. 4,341,663 to H. Derleth et al. indicates that extrusion of a silica gel, for example, can be used to form a shaped body which is then cut so that the ratio of length to diameter is approximately equal. These cut lengths may then be rounded off (e.g., by a rotating drum, rotating disk, or the like) to form essentially spherical shaped bodies.

5. U.S. Pat. No. 4,838,914 to H. Ohta et al. teaches the extrusion of a silica spinning solution into gel fibers in the production of silica glass fibers.

None of the previously discussed five references appear to illustrate the use of an extrusion procedure to directly form a particulate (or granular) ceramic precursor gel product as contrasted to a formed body (e.g., pellet, fiber, or the like) capable of further substantial size reduction.

More recently, U.S. Pat. Nos. 4,767,429 and (in particular) 4,872,895 to J. W. Fleming et al. disclose the mechanical subdivision of a substantially cohesive gel body by forcing the gel body through a screen having a substantially uniformly spaced, rectilinear grid of strands, e.g., of metallic or polymeric wires. Fleming et al. ,895 indicates that the gel particles resulting from the extrusion step shrink during the drying step which follows due to the result of liquid evaporation and that the degree of shrinkage depends upon the drying procedure used. Example 2 mentions drying in a conventional, glass vacuum dryer. Example 3 mentions drying the gel particles in a microwave oven.

U.S. Pat. No. 4,943,425 to Sophia R. Su et al. mentions mechanically crushing a silica gel through a screen followed by drying.

The Fleming et al. and Su et al. patents, although mentioning the extrusion of silica gel through a screen to form a particulate product, do not discuss the requirements of any downstream processing steps (e.g., material handling up to drying) for the wet gel extrudate.

DESCRIPTION OF THE INVENTION

The instant process is directed to the extrusion of a ceramic precursor gel through a screen using a mechanical force to produce a granular or particulate ceramic precursor gel product and handling the material formed from the extrusion operation in such a manner so as not to adversely affect the product morphology of the extrudate.

The present process relates to improvements in the formation of ceramic precursor gel particles, such as silica, by extruding a gel through a screen. Although the main description which follows will focus upon the production of high purity silica gel particles, it is to be understood that the instant process is also applicable to the production of other particulate gel particles from their respective precursor gels including those of mullite, the aluminosilicates, mixtures of zirconia and silica, titania, and titania aluminate.

The first step in forming the desired particulate product is the formation of a gel body which can be extruded through a screen. In the case of silica, an alkyl silicate (e.g., tetraethyl silicate) is subjected to a conventional sol-gel synthesis preferably using an acid catalyst to form a sol followed by a base addition as the gelling agent. A recent review which discusses the sol-gel procedure is entitles "The Sol-Gel Process", by L. L. Hench et al., and appears in Chem. Rev. 1990, 90, pp. 33-72. It is incorporated herein by reference as illustrating how such gels are formed.

It has been found advantageous, in accordance with a preferred aspect of the present invention, to use ammonium carbonate (e.g., at 0.1 N to 10 N) as the gelling agent. This gelling agent has been found to exert a buffering action in the system which slows down the overall gelling phenomenon as compared, for example, to the use of ammonium hydroxide. This reduces undesired localized gelation and gives a more homogeneous gelled product.

The gel which results from the previously described sol-gel procedure should contain a relatively large volume of liquid, be wet and be cohesive enough to be mechanically extrudable through the screen. Generally, it will have a water content of from about 50% to about 95% by weight. The screen size is advantageously 0.1 mm to 5 mm with the screen being of such materials as stainless steel, nylon, or a nickel-based alloy (HASTELLOY alloy) and the pressure applied to the gel during the extrusion procedure is advantageously from about 5 psi to about 100 psi and is preferably applied in a direction normal to the plane of the screen.

The gel extrusion step which is described hereinabove allows for the production of macroscopic (i.e., visible to the eye) gel particles having a relatively narrow particle size distribution. Generally speaking, the lower range for the average dry particle diameter will be about 50 microns to about 2,000 microns. The porosity (pore size) will generally range from about 1.5 nm to about 50 nm which yields a particulate product which can be said to be "microporous" or "nanoporous" although some large pores may occur due to particle fracture.

It is an important feature of the present invention that the material handling steps for the gel extrudate from the termination of the extrusion step to the termination of the latter drying step (including any intermediate storage period) be such that the product morphology is not compromised. For example, the layering of the extrudate in thick beds, during either storage or drying, will tend to have the wet gel particles agglomerate or become welded and may very well have a deleterious effect on the particle size distribution desired. In addition, the desired pore morphology (e.g., pore volume and pore diameter) can be adversely affected by use of vacuum (i.e., less than about 0.1 atmosphere) during drying, for example, even if other precautions regarding non-layering are followed. Preferably, the extrudate can be fed directly into the dryer in a semi-continuous fashion.

In regard to drying procedures, it has been found that the drying operation should be performed with the extrudate not being allowed to layer upon itself to any substantial extent so as to cause agglomeration or welding. The process of this invention uses an essentially thermal method of drying as contrasted to microwave drying which is an electromagnetic energy input. This may be advantageously performed in a vibrating fluidized bed dryer which has been found to yield a rapid rate of drying with a minimization of agglomeration and attrition. Use of certain other types of drying apparatus have been found to be distinctly inferior. Large tumble driers (e.g., over 4 feet in diameter), such as advocated in U.S. Pat. No. 5,017,354, have been found to require relatively long drying times (four hours) with a high level (30%-50%) of fines being produced. These fines cannot be reagglomerated and represent waste. Vacuum tray drying, which relies upon conductive heat transfer (a low heat transfer process), is even more slow (six hours) and yields a low density, porous product which may be unsuitable for some uses where a high density, non-porous product is desired (i.e., the formation of crucibles, etc.). It generates a lower amount of fines (e.g., about 10%).

In essence, the combined absence of a high bed depth of the silica particles (i.e., the product is maintained so that packing of the gel is substantially prevented), the absence of a high or strong vacuum (i.e., below about 0.1 atm) and rapid drying (e.g., about one hour as compared to four to six hours) is deemed to be necessary in substantially retaining the morphology of the particles produced by the extrusion process. Two criteria are important to the overall process: a relatively high yield of product and a relatively high tap density (about 1.1 gm/cc or above). Tap density is determined by placing a known weight of product into a container with volumetric marks, tapping the filled container a set number of times to settle the contents, and then determining the tap density by dividing the weight by the volume.

The following represents a summary of the results of various drying procedures:

| Type of Drying | Drying Pressure (Atm) | Bed Depth (in) | Tap Density (inches) | Yield (%) |
| --- | --- | --- | --- | --- |
| Vacuum* Tumble Drying | 0.2 | 24 | 1.18 | 30–40 |
| Lab Tray Drying | 1.0 | 3 | 1.1 | ~100 |
| Vacuum** Tray Drier | 0.05 | 3 | 0.92 | ~100 |
| Vibrating Fluidized Bed | 1.0 | 4–6 | 1.1 | ~90 |
| Lab Rotary Drier | 1.0 | 4 | 1.1 | ~95 |

*Arc fusion density was 2.18 gm/cc which was deemed acceptable.
**Arc fusion density was 2.01 gm/cc which was deemed unacceptable.

The present invention is further illustrated by the examples which follow.

EXAMPLE 1

This example illustrates the composition and method used to produce silica gel particles which will yield a narrow size distribution for the final product.

A sol was prepared by combining the following reagents in the sequence and times listed. Each addition of reagent was followed by vigorous stirring:

| Time (min) | Volume Added (ml) | Solution Added |
| --- | --- | --- |
| 0 | 25 | Ethanol |
| 1 | 25 | 1N HNO$_3$ |
| 2 | 50 | TEOS* |
| 3 | 50 | TEOS |
| 4 | 25 | Water |
| 5 | 100 | TEOS |
| 6 | 25 | Water |
| 7 | 100 | TEOS |
| 8 | 25 | Water |
| 9 | 100 | TEOS |
| 10 | 50 | Water |
| 11 | 200 | TEOS |
| 12 | 100 | Water |
| 13 | 400 | TEOS |
| 14 | 275 | Water |
| 15 | 250 | Water |
| 16 | 250 | Water |

A largely transparent sol was made by the previously described reaction sequence. This sol was then reacted by placing a PYREX glass flask containing the sol into boiling water to bring it to a boil and allowing it to remain for about ten minutes under reflux. After this period of time had elapsed, the flask containing the sol was cooled externally by immersion in a water/ice bath.

The sol was characterized by determining the time required to gel the sol under the following set of conditions:

1. The sol was chilled to 2° C.±1° C.;
2. An aqueous solution of 4 wt% ammonium carbonate was chilled to 2° C.±1° C.;
3. The sol (90 ml) was then mixed with 10 ml of the chilled ammonium carbonate solution in a chilled eight ounce jar for five seconds;

4. The viscosity of the resulting solution was then measured using a Brookfield viscometer;

5. When the viscosity rose to twice the value initially determined in step No. 4, the solution was considered to have gelled;

6. The time from completion of adding the components together to the time of gelation was considered to be the gel time.

The targeted gel time was between two and three minutes. If longer than three minutes, the sol needed more boiling. If shorter than two minutes, a new sol needed to be prepared and needed to be boiled for a shorter duration of time In order to produce a gel for extrusion, the following steps were taken:

1. A sol was obtained with a gel time of from two to three minutes, as described above, and was chilled to 2° C.±1° C;

2. A solution of 3.22 wt % ammonium carbonate was prepared and was chilled to 2° C.±1° C;

3. The sol (250 ml) was then mixed vigorously with 38 ml of ammonium carbonate solution;

4. The resulting sol was transferred to the inverted barrel of a cylinder fitted with a sealed ram piston and the open end of the cylinder was fitted with a screen having an opening size of from 0.1 mm to about 5 mm.

After about two minutes the cylinder was inverted and the piston was advanced to extrude the gel through the screen with the exertion of gas pressure on the piston. A typical pressure used was 100 psi.

EXAMPLE 2

This example sets forth the differing results obtained when the type of gel made in accordance with Example 1 was dried on either a rotary, convective tray dryer (WYSSMONT brand), a vibrating fluid bed dryer, or a static, vacuum tray dryer. Two runs on each type were made, with the calcined silica grain, after heating to 1350° C. in oxygen gas, and the fused silica glass ingots being analyzed:

| Dryer | Analysis of Calcined Grain | | |
|---|---|---|---|
| | Beta No. | Carbon (ppm) | Surface Area (m$^2$/gm) |
| Tray, Convective | 0.113 | 9.5 | 0.4 |
| Tray, Convective | 0.252 | 9.0 | 1.4 |
| Tray, Static (Vacuum) | 0.299 | 3.3 | 0.2 |
| Tray, Static (Vacuum) | 0.128 | 7.0 | 0.3 |
| Fluid Bed, Vibrating | 0.089 | 9.5 | 0.8 |
| Fluid Bed, Vibrating | 0.156 | 10.0 | 0.6 |

The beta number for the sample dried in the vibrating fluid bed dryer was lower than either of the other samples dried in the two types of tray dryer thereby indicating a lower water content for the material.

| Dryer | Analysis of Fused Ingots | |
|---|---|---|
| | Beta Number (mm$^{-1}$) | Archimedes Density (g/cc) |
| Tray, Convective | 0.066 | 2.1877 |
| Tray, Convective | 0.054 | 2.20017 |
| Tray, Static | 0.108 | 2.20011 |
| Tray, Static | 0.074 | 2.19883 |
| Fluid Bed, Vibrating | 0.052 | 2.20078 |
| Fluid Bed, Vibrating | 0.066 | 2.20135 |

The high Archimedes density values for the fused ingots made from the product dried in the vibrating fluid bed dryer is indicative of a lower degree of bubble formation while the lower beta number is indicative of a lower water content which is also desired.

EXAMPLE 3

For a number of applications (e.g., the formation of high quality silica glass crucibles) a high purity, vitreous silica grain with a narrow particle size distribution, is more permeable to gases and fluids than a broad particle size distribution material of equivalent mean particle size. Also, such a narrow particle size distribution material can be chosen to have a mean particle diameter substantially larger than the diameter considered respirable thereby being of a reduced concern from a health standpoint as compared to a product having a broader particle size distribution which might contain a substantial fraction of respirable dust.

Careful post-extrusion processing can yield such a narrow particle size distribution product. Four handling methods were studied: (A) drying in a two inch deep static bed; (B) vacuum drying in a four inch deep rotating PYREX glass flask; (C) vacuum drying in a two foot deep rotating glass-lined tumble dryer; and (D) vacuum drying in a four foot deep rotating glass-lined tumble dryer.

The Table set forth below shows the results of the four dryer types.

| Sieve Opening (μm) | Wt % Retained | | | |
|---|---|---|---|---|
| | A | B | C | D |
| 500 | 0 | 0 | 17.4 | 62.8 |
| 425 | 34.5 | 18.4 | 15.7 | 4.5 |
| 355 | 27.7 | 52.2 | 19.8 | 3.1 |
| 300 | 16.8 | 15.3 | 19.7 | 3.4 |
| 250 | 5 | 5.2 | 8.3 | 5.6 |
| 150 | 9.3 | 5.2 | 17.2 | 4.9 |
| 106 | 2.9 | 1.3 | 3.9 | 4.0 |
| Pan | 3.7 | 2.4 | 10.6 | 11.8 |

The above data indicate that the particle size distribution is unfavorably effected by increasing the bed depth of the post-extrusion grain in the rotary vacuum dryer. Since the post-extruded gel particles are plastic and chemically reactive, the weight of the bed comprising them can act to force the particles to bond together resulting in larger particles. Conversely, the tumbling action of the rotating vacuum dryer can break apart particles due to mechanical action. The significance of this mechanical action increases as the size of the dryer is increased for equal angular velocities of each. The effect of increasing the size of the dryer is to create large particles, by particle bonding, as well as small particles by mechanical action (or attrition), thereby undesirably broadening the particle size distribution of the product.

The foregoing Examples have been set forth to illustrate certain embodiments of the present invention and, for that reason, they should not be construed in a limiting sense. The scope of protection sought is set forth in the claims which follow.

We claim:

1. A process for forming a particulate ceramic precursor which comprises:
   (a) mechanically extruding a viscoelastic ceramic precursor gel through a screen to produce a particulate extrudate;

(b) collecting the extrudate from (a) while substantially preventing packing of the gel particles comprising the extrudate; and (c) drying the product from (b) without substantial vacuum while the packing of the gel is substantially prevented so as to substantially maintain the morphology of the particles in the product from (b).

2. A process as claimed in claim 1 wherein the ceramic precursor gel is silica gel.

3. A process as claimed in claim 1 wherein the mechanical force is supplied by a piston ram.

4. A process as claimed in claim 1 wherein the gel which is extruded has a water content of from about 50% to about by weight.

5. A process as claimed in claim 1 wherein the ceramic precursor gel is silica gel having a water content of from about 50% to about 95%, by weight.

6. A process as claimed in claim 5 wherein the gel is mechanically extruded using a piston ram.

* * * * *

UNITED STATES PATENT AND TRADEMARK OFFICE
CERTIFICATE OF CORRECTION

PATENT NO. : 5,236,651
DATED : August 17, 1993
INVENTOR(S) : Garry J. Garvey et al.

It is certified that error appears in the above—identified patent and that said Letters Patent is hereby corrected as shown below:

Col. 2, line 4, ",895" should read -- '895 --;

Col. 2, line 47, "entitles" should read -- entitled --; and

Col. 8, line 5, "to about by weight" should read -- to about 95% by weight --.

Signed and Sealed this

Fifth Day of April, 1994

Attest:

BRUCE LEHMAN

Attesting Officer

Commissioner of Patents and Trademarks